US011201005B2

(12) United States Patent
Deland

(10) Patent No.: US 11,201,005 B2
(45) Date of Patent: Dec. 14, 2021

(54) SOLENOID HAVING INVERSE TAPERED ARMATURE FOR SOLENOID-ACTUATED VALVE

(71) Applicant: BorgWarner Inc., Auburn Hills, MI (US)

(72) Inventor: Daniel L. Deland, Davison, MI (US)

(73) Assignee: Borg Warner Inc., Auburn Hills, MI (US)

( * ) Notice: Subject to any disclaimer, the term of this patent is extended or adjusted under 35 U.S.C. 154(b) by 3 days.

(21) Appl. No.: 16/313,963

(22) PCT Filed: Jun. 28, 2016

(86) PCT No.: PCT/US2016/039832
§ 371 (c)(1),
(2) Date: Dec. 28, 2018

(87) PCT Pub. No.: WO2018/004538
PCT Pub. Date: Jan. 4, 2018

(65) Prior Publication Data
US 2020/0126702 A1    Apr. 23, 2020

(51) Int. Cl.
*H01F 7/08* (2006.01)
*F16K 31/06* (2006.01)
(Continued)

(52) U.S. Cl.
CPC ........... *H01F 7/081* (2013.01); *F16K 27/048* (2013.01); *F16K 31/0613* (2013.01);
(Continued)

(58) Field of Classification Search
CPC ............... F16K 27/048; F16K 31/0603; F16K 31/0613; F16K 31/0675; H01F 3/10;
(Continued)

(56) References Cited

U.S. PATENT DOCUMENTS 3,851,285 A * 11/1974 Rothfuss ............... H01F 7/1607
335/262
4,149,132 A  4/1979 Richter et al.
(Continued)

FOREIGN PATENT DOCUMENTS

CN    101523524 A    9/2009
CN    102272501 A    12/2011
(Continued)

OTHER PUBLICATIONS

English language abstract for JP 2012-199490 extracted from espacenet.com database on Jun. 22, 2020, 1 page.
(Continued)

*Primary Examiner* — Matthew W Jellett
(74) *Attorney, Agent, or Firm* — Howard & Howard Attorneys PLLC

(57) ABSTRACT

A solenoid (54) for a solenoid-actuated valve (30) includes a sintered powder metal one-piece core (64) of at least one soft magnetic material and at least one non-magnetic material integrally connected together and a movable armature (88) disposed in the core (64) and having a tapered tip to achieve a required force vs position and current characteristics.

16 Claims, 4 Drawing Sheets

(51) Int. Cl.
*H01F 7/13* (2006.01)
*H01F 7/16* (2006.01)
*F16K 27/04* (2006.01)
*H01F 3/10* (2006.01)

(52) U.S. Cl.
CPC .......... *F16K 31/0675* (2013.01); *H01F 7/13* (2013.01); *H01F 7/1607* (2013.01); *H01F 2003/106* (2013.01); *H01F 2007/085* (2013.01); *H01F 2007/086* (2013.01)

(58) Field of Classification Search
CPC ... H01F 7/081; H01F 7/13; H01F 7/16; H01F 7/1607; H01F 2007/085; H01F 2007/086; H01F 2003/106
See application file for complete search history.

(56) References Cited

U.S. PATENT DOCUMENTS

| | | | |
|---|---|---|---|
| 4,430,295 A * | 2/1984 | Jandeska, Jr. | C22C 33/0214 419/46 |
| 4,604,600 A * | 8/1986 | Clark | H01F 7/13 335/261 |
| 6,179,005 B1 * | 1/2001 | Inami | F16K 31/0613 137/625.65 |
| 6,206,343 B1 | 3/2001 | Kato et al. | |
| 6,498,416 B1 | 12/2002 | Oishi et al. | |
| 6,501,359 B2 | 12/2002 | Matsusaka et al. | |
| 6,547,215 B2 | 4/2003 | Matsusaka et al. | |
| 6,601,822 B2 | 8/2003 | Tachibana et al. | |
| 6,615,869 B2 | 9/2003 | Sudani et al. | |
| 6,634,381 B2 | 10/2003 | Matsusaka et al. | |
| 6,806,802 B2 | 10/2004 | Oishi et al. | |
| 6,987,437 B2 | 1/2006 | Matsusaka et al. | |
| 7,474,948 B2 | 1/2009 | Sandstrom | |
| 8,070,129 B2 | 12/2011 | Makino | |
| 8,138,871 B2 | 3/2012 | Gruen et al. | |
| 8,203,405 B2 | 6/2012 | Golz et al. | |
| 8,368,493 B2 | 2/2013 | Murao | |
| 9,528,626 B2 | 12/2016 | Holmes et al. | |
| 2001/0048091 A1 | 12/2001 | Enomoto et al. | |
| 2003/0062660 A1 * | 4/2003 | Beard | B22F 7/06 264/645 |
| 2004/0085169 A1 | 5/2004 | Matsusaka et al. | |
| 2005/0178451 A1 * | 8/2005 | Inami | F16K 31/0613 137/625.65 |
| 2008/0035761 A1 | 2/2008 | Akabane | |
| 2008/0180200 A1 | 7/2008 | Gamble | |
| 2009/0072174 A1 | 3/2009 | Makino | |
| 2010/0139795 A1 | 6/2010 | Holmes et al. | |
| 2011/0285485 A1 | 11/2011 | Deland | |
| 2011/0303861 A1 | 12/2011 | Jones | |
| 2013/0112904 A1 * | 5/2013 | Tanari | F16K 31/0675 251/129.15 |
| 2014/0361206 A1 | 12/2014 | Holmes et al. | |
| 2017/0175918 A1 | 6/2017 | Deland | |

FOREIGN PATENT DOCUMENTS

JP 2012199490 A 10/2012
WO 2010117477 A2 10/2010

OTHER PUBLICATIONS

International Search Report for Application No. PCT/US2016/039832 dated Mar. 20, 2017, 3 pages.
Rotors, Herbert C., "Electro-Magnetic Devices", John Wiley and Sons, 1941, pp. 212-213.
English language abstract for CN 101523524 extracted from espacenet.com database on Nov. 20, 2019, 1 page.
English language abstract for CN 102272501 extracted from espacenet.com database on Nov. 20, 2019, 2 pages.
English Translation of Relevant Portions of Sun, Jie et al., "Technical Fundamentals of Mechanical Manufacturing", Jan. 31, 2014, p. 267, provided by China Patent Agent (H.K.) Ltd on May 13, 2021, 4 pages.
English Translation of Relevant Portions of Zhang, Liping et al., "Hydraulic and Pneumatic Transmission and Control", Feb. 29, 2012, pp. 123-124, provided by China Patent Agent (H.K.) Ltd on May 13, 2021, 6 pages.

* cited by examiner

SOLENOID HAVING INVERSE TAPERED ARMATURE FOR SOLENOID-ACTUATED VALVE

CROSS-REFERENCE TO RELATED APPLICATIONS

The present application is the National Stage of International Patent Application No. PCT/US2016/039832, filed on Jun. 28, 2016, which is hereby expressly incorporated herein by reference in its entirety.

BACKGROUND OF INVENTION

1. Field of Invention

The present invention relates generally to solenoid-actuated valves and, more specifically, to a solenoid having an inverse tapered armature and a sintered sandwiched solenoid core for a solenoid-actuated valve.

2. Description of the Related Art

Conventional vehicles known in the art typically include an engine having a rotational output as a rotational input into a transmission such as an automatic transmission. The engine generates the rotational output which is selectively translated to the transmission which, in turn, translates rotational torque to one or more wheels. The transmission changes the rotational speed and torque generated by the engine through a series of predetermined gearsets, whereby changing between the gearsets enables a vehicle to travel at different vehicle speeds for a given engine speed.

In addition to changing between the gear sets, the automatic transmission is also used to modulate engagement with the rotational output of the engine, whereby the transmission can selectively control engagement with the rotational output of the engine so as to facilitate vehicle operation. By way of example, torque translation between the rotational output of the engine and the input into the automatic transmission is typically interrupted while the vehicle is parked or idling, or when the transmission changes between the gearsets. In conventional automatic transmissions, modulation is achieved via a hydrodynamic device such as a hydraulic torque converter. However, modern automatic transmissions may replace the torque converter with one or more electronically and/or hydraulically actuated clutches (sometimes referred to in the art as a "dual clutch" automatic transmission). Automatic transmissions are typically controlled using hydraulic fluid and a hydraulic system including a pump assembly, a valve housing having one or more solenoid-actuated valves, and an electronic controller. The pump assembly provides a source of fluid power to the solenoid-actuated valves of the valve housing which, in turn, are actuated by the controller so as to selectively direct hydraulic fluid throughout the automatic transmission to control modulation of rotational torque generated by the rotational output of the engine. The solenoid-actuated valves are also typically used to change between the gear sets of the automatic transmission, and may also be used to control hydraulic fluid used to cool and/or lubricate various components of the transmission in operation.

The solenoid-actuated valve includes a solenoid and a valve actuated by the solenoid. In a simplified form, the solenoid includes a coil, armature, and a flux path typically defined by a core of a pole piece, flux tube, and can.

Eccentricity of the armature in the solenoid results in radial forces. The radial forces apply load to bearing surfaces and that results in friction. The radial force produced is a function of eccentricity and radial clearance. This is described in *Electro Magnetic Devices*—Herbert C Rotors, John Wiley and Sons, 1941. If the armature is perfectly centered, no radial force is produced. As eccentricity increases radial force increases and reaches a maximum as the armature contacts an inner surface of the other flux path component(s). Eccentricity is unavoidable because of clearance in the bearing surfaces and manufacturing tolerances in the components. Increasing the magnetic clearance in relation the eccentricity will reduce the radial force but there will also be some reduction in axial force. Therefore, to maximize an axial force while not exceeding a tolerable level of radial force, it is known to combine the pole piece and the flux tube of the solenoid into a single piece and guide the armature directly in the pole piece and flux tube with a non-magnetic coating on the armature such as high phosphorus electroless-nickel or a polymer. With the one-piece core and coated armature, the positional variations that result from a multi-piece assembly are eliminated and the armature can be guided in the core with minimal physical clearance.

However, a major draw-back of this one piece core construction is that the flux tube and the pole piece are connected by a bridge. The connection is both physical and magnetic. The solenoid will produce very little force until the flux bridge is magnetically saturated. Flux that passes through the bridge does not pass through the armature and does not contribute to the force available from the solenoid. The remainder of the flux path must have additional cross sectional area of roughly twice the bridge cross-section to carry the flux that passes through the armature along with the flux through the bridge. The cross-sectional area of the bridge must be a compromise between minimizing the magnetic short circuit and adequate mechanical strength. These types of solenoids typically have a tapered pole shunt to shape the force vs position and current characteristics of the solenoid. The taper on the pole precludes the possibility of making the multi-material PM core in a single tool.

Accordingly, it is desirable to provide a new solenoid for a solenoid-actuated valve to assist an automatic transmission. It is also desirable to provide the solenoid with a one-piece core from two or more powder metal materials, at least one material having soft magnetic properties and at least one material having non-magnetic properties that is a structural connection between the magnetic portions of the core, the flux tube and the pole. It is further desirable to provide the solenoid with a core material with interfaces perpendicular to an axis of compression that can be used a single tool. It is still further desirable to provide the solenoid with the armature having a force shaping taper instead of the pole piece that allows the material interfaces to be perpendicular to the axis allowing for a more cost effective manufacturing process. Therefore, there is a need in the art to provide a solenoid having an inverse tapered armature and a sintered sandwiched solenoid core for a solenoid-actuated valve that meets at least one of these desires.

SUMMARY OF THE INVENTION

Therefore, it is the object of the present invention to realize a solenoid with a one-piece core having higher mechanical strength and at the same time to eliminate the magnetic short-circuit through the bridge.

The present invention provides a solenoid for a solenoid-actuated valve including a sintered powder metal one-piece core comprised of at least one soft magnetic material and at least one non-magnetic material integrally connected together and a movable armature disposed in the core and having a tapered tip to achieve a required force vs position and current characteristics.

One advantage of the present invention is that a new solenoid for a solenoid-actuated valve is provided. Another advantage of the present invention is that the solenoid includes a flux tube, and a one piece core from two or more powder metal materials, at least one having soft magnetic properties and at least one material having non-magnetic properties. Yet another advantage of the present invention is that the solenoid includes an armature having a force shaping taper that allows the material interfaces to be perpendicular to the axis, thereby allowing for a more cost effective manufacturing process. Still another advantage of the present invention is that the solenoid allows the possibility of making the multi-material powdered metal core in a single tool.

Other objects, features, and advantages of the present invention will be readily appreciated as the same becomes better understood after reading the subsequent description taken in connection with the accompanying drawings.

DETAILED DESCRIPTION OF THE INVENTION

Figure 1:
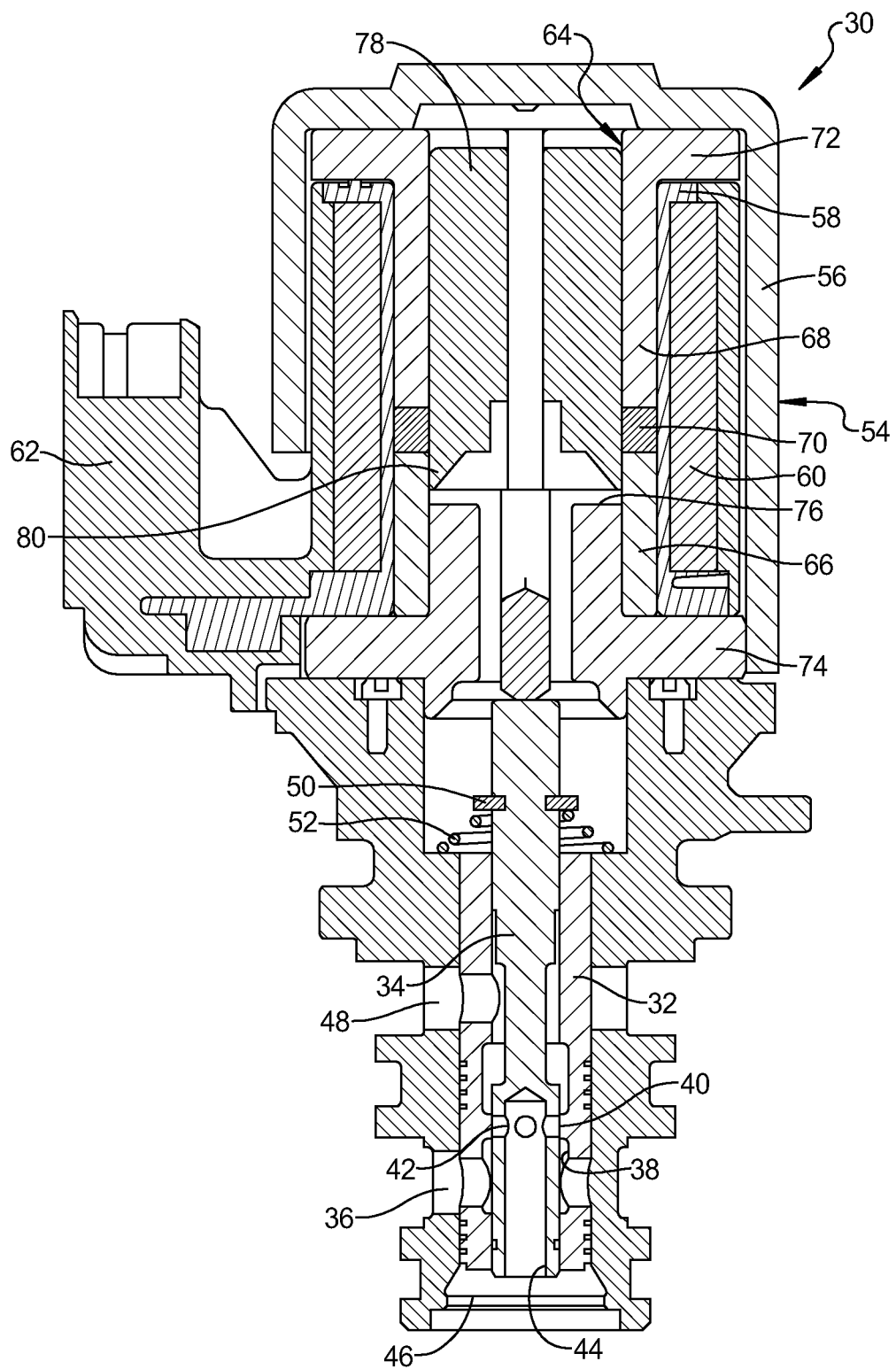
FIG. 1 is cross-sectional view of one embodiment of a solenoid-actuated valve, according to the present invention.

Referring now to the figures, where like numerals are used to designate like structure unless otherwise indicated, a solenoid-actuated valve 30, according to one embodiment of the present invention, is shown in FIG. 1 for use in conjunction with an automatic transmission (not shown) for a vehicle (not shown). The vehicle includes an engine (not shown) that cooperates with the automatic transmission. The engine generates rotational torque which is selectively translated to the automatic transmission which, in turn, translates rotational torque to one or more wheels of the vehicle. It should be appreciated that the engine and/or automatic transmission could be of any suitable type, configured in any suitable way sufficient to generate and translate rotational torque so as to drive the vehicle, without departing from the scope of the present invention. It should also be appreciated that the solenoid-actuated valve 30 may be used in another system such as in a transfer case, locking differential, or a disconnect clutch in a hybrid drivetrain. It should further be appreciated that the solenoid-actuated valve 30 may be used in other applications where it is necessary to modulate the engagement of a system.

As illustrated in FIG. 1, the solenoid-actuated valve 30 includes a valve body 32 and a valve 34. The valve body 32 includes one or more supply or fluid ports 36, a passage 38 that is annular and extends axially, and one or more metering lands 40 that are annular and disposed along the passage 38. The supply ports 36 are fluidly connected to the passage 38. The valve 34 is slideably disposed in the passage 38 of the valve body 32. The valve 34 is cylindrical in shape and extends axially. The valve 34 includes one or more metering ports 42 and a passage 44 that is annular and extends axially. The metering ports 42 fluidly connect to the passage 44 to allow fluid flow to and from a controlled device (not shown) through a control port 46 in the valve body 32. The valve body 32 also includes one or more exhaust ports 48 to vent fluid from the controlled device for reduction of control pressure. The solenoid-actuated valve 30 also includes a retainer 50 on the valve 34 and a bias spring 52 that is disposed between the retainer 50 and the valve body 32 and pushes upward against the retainer 50 on the valve 34. It should be appreciated that the valve 34 is integral, unitary, and one-piece. It should also be appreciated that the valve 34 moves axially relative to the valve body 32. It should further be appreciated that the valve 34 is adapted to control the flow of pressurized hydraulic fluid between the ports of the valve body 32.

Figure 2:
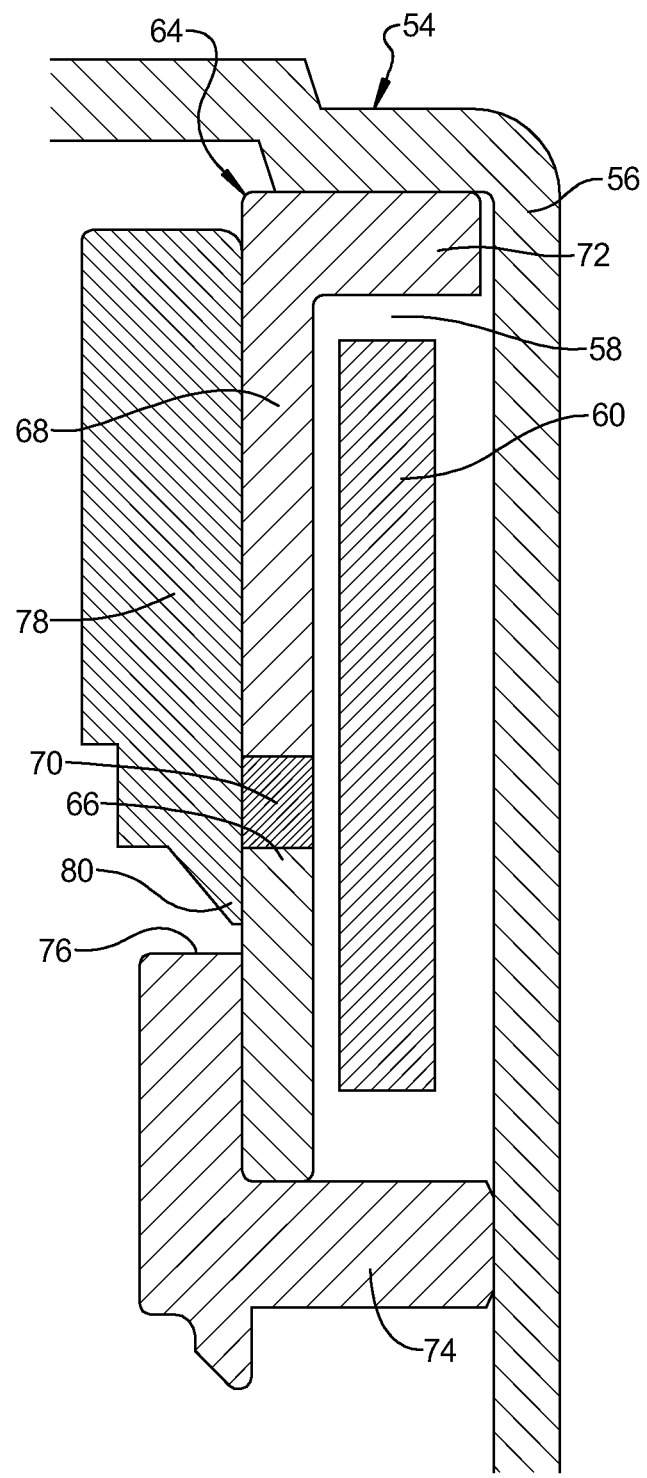
FIG. 2 is an enlarged view of a portion of the solenoid-actuated valve of FIG. 1.

Referring to FIGS. 1 and 2, the solenoid-actuated valve 30 also includes an electronically controlled solenoid or solenoid actuator, generally indicated at 54, for actuating the valve 34 to control hydraulic fluid pressure and flow between the ports. The solenoid 54 includes a magnetic housing or frame referred to as a casing or can 56. The can 56 is typically fabricated from a soft magnetic material, such as low carbon steel. The solenoid 54 also includes a bobbin 58 mounted inside the can 56. The bobbin 58 is typically made from a non-magnetic material such as a plastic or other polymeric material. The bobbin 58 has a primary electromagnetic coil 60 wound thereon to create a magnetic field when energized. The coil 60 is fabricated with copper wire. The solenoid 54 further includes an electrical connector 62 for connecting with the electromagnetic coil 60 and to ground (not shown). The electrical connector 62 includes one or more electrical terminals (not shown) to allow for connection with a control source which controls current actuation of the coil 60. It should be appreciated that the terminal receives a digital control signal from a primary driver (not shown) such as the electronic controller (not shown).

The solenoid 54 includes a sintered powder metal one-piece core, generally indicated at 64, disposed within the can 56. The core 64 includes a pole piece 66 positioned within the bobbin 58 and encircled by the coil 60. The pole piece 66 is magnetically connected with the can 56. The core 64 also includes a flux tube 68 partially positioned within the bobbin 58 and encircled by the coil 60. The flux tube 68 is generally cylindrical in shape with a generally circular cross-section. The flux tube 68 is axially aligned with the pole piece 66. The flux tube 68 is magnetically connected with the can 56. The flux tube 68 and the pole piece 66 are integrally connected by a non-magnetic flux choke 70. The flux choke 70 axially separates the pole piece 66 from the flux tube 68. The flux tube 68 has an integral flange 72 which is magnetically connected with the can 56. The solenoid 54 includes a flux washer 74 assembled to the pole piece 66 and is magnetically connected with the can 56. It should be appreciated that the flux washer 74 incorporates a pole face 76. It should also be appreciated that the solenoid 54 has a flux path comprised of the pole piece 66, flux tube 68, flux washer 74, and the can 56.

The sintered powder metal one-piece core 64 is comprised of at least one soft magnetic material and at least one non-magnetic material integrally connected together. In one embodiment, the flux choke 70 is comprised of austenitic stainless steel and the pole piece 66 and the flux tube 68 are comprised of phosphorus iron. In another embodiment, the flux choke 70 is comprised of austenitic stainless steel and the flux tube 68 and the pole piece 66 are comprised of cobalt iron.

The solenoid 56 further includes an armature 78 slideably disposed in the bores of the pole piece 66 and flux tube 68 for generating axial actuation force. The armature 78 is generally cylindrical in shape and extends axially. The armature 78 includes a tapered shunt 80 configured to produce a desired force vs position and current characteristics of the solenoid 54. Optionally, the solenoid 54 may include a thin coating of high phosphorus electroless nickel material, a fluoropolymer material such as Xylan, or other non-magnetic material coated on the armature 78 or the interior of the pole piece 66 or the interior of the flux tube 68. It should be appreciated that the flux choke 70 provides a physical connection of the flux tube 68 to the pole piece 66. It should also be appreciated that the flux choke 70 also provides a continuous bore from flux tube 68 through the pole piece 66 such that the bearing surface of the armature 78 can slidably enter and exit the pole piece 66.

In operation, an electronic controller (not shown) is in electrical communication with the solenoid-actuated valve 30 to activate or energize the solenoid 54 to actuate the valve 34 or to deactivate or de-energize the solenoid 54 to de-actuate the valve 34 to actively control fluid flow to and from the solenoid-actuated valve 30.

Figure 3A:
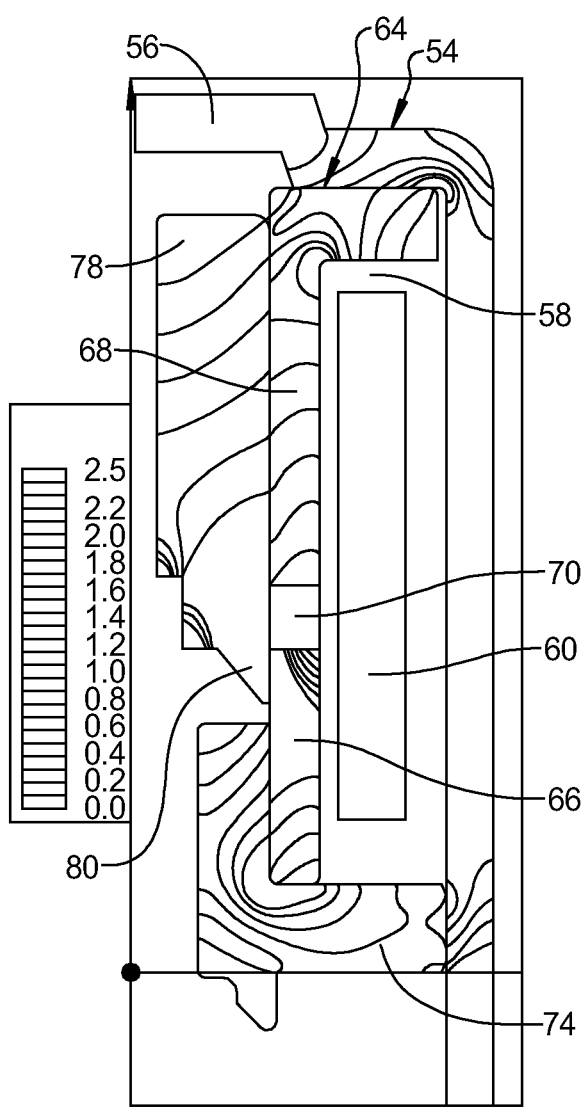
FIG. 3A is a half section view of an axisymmetric finite element analysis (FEA) model for the portion of the FIG. 2 illustrating flux density contours and lines of flux with 0.1 Ampere through a coil of the solenoid.
Figure 3B:
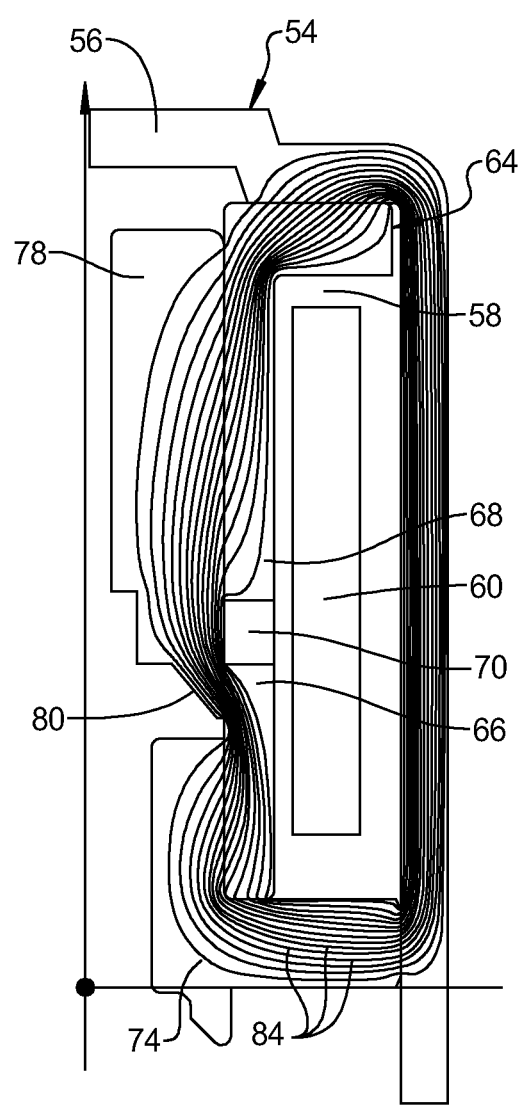
FIG. 3B is a view similar to FIG. 3A of the axisymmetric FEA model illustrating flux density contours and lines of flux with 0.1 Ampere through the coil of the solenoid.

Referring to FIGS. 3A and 3B, half section views of an axisymmetric finite element analysis (FEA) model of the solenoid 54 showing flux density contours and lines of flux with 0.1 Ampere through the coil 60 of the solenoid 54. In contrast to the prior art solenoid, nearly all the flux goes through the armature 78 making it available to produce useful force. It should be appreciated that little flux goes through the flux choke 70.

Figure 4:
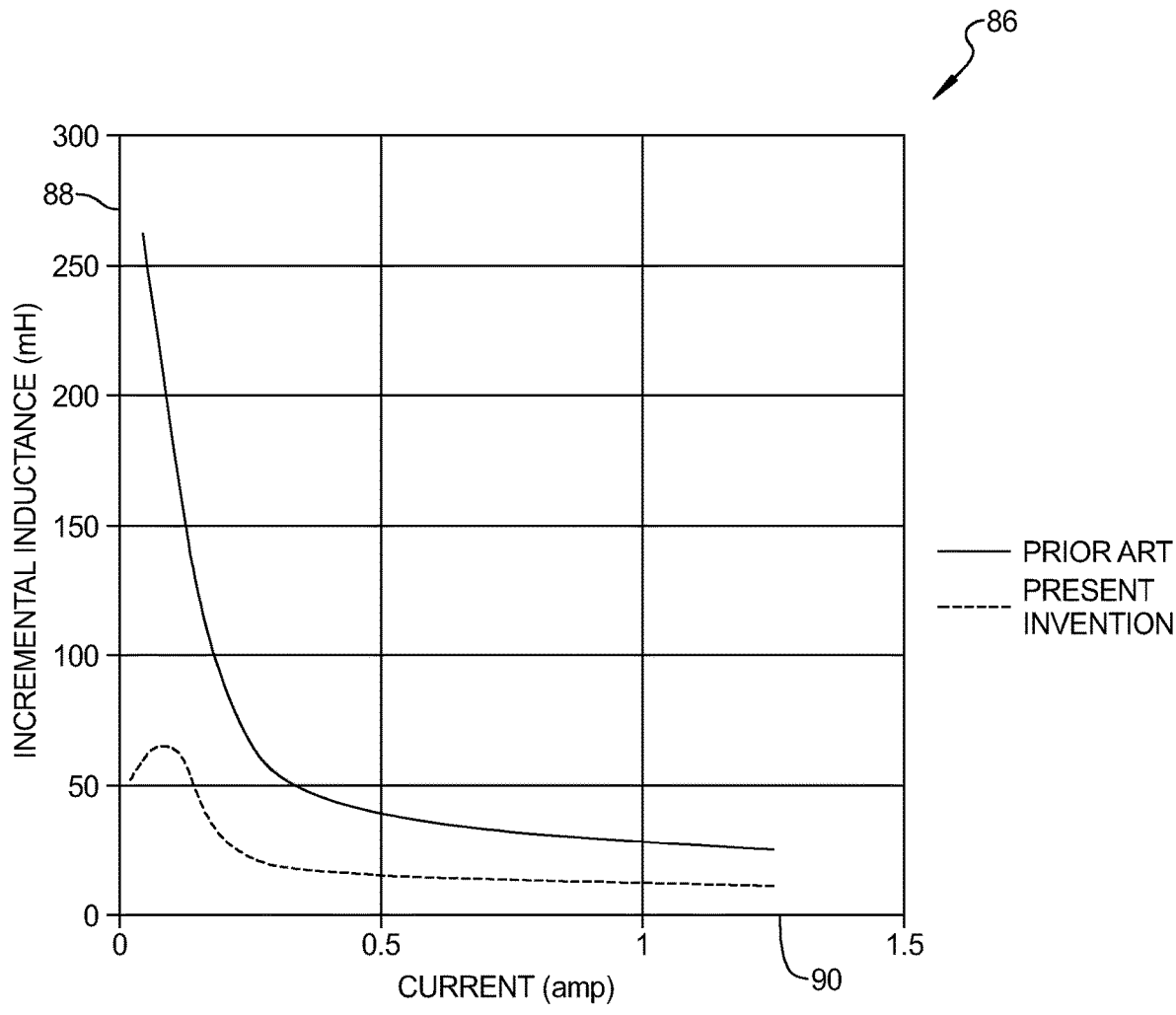
FIG. 4 is a view of a plot contrasting incremental inductance of a prior art solenoid and the present invention solenoid of the solenoid-actuated valve of FIG. 1.

Referring to FIG. 4, a plot 86 is shown contrasting the incremental inductance of the prior art solenoid and the present invention solenoid 54 as a function of current with the armature at mid stroke. The plot 86 includes a vertical axis 88 of incremental inductance in milliHenry (mH) and a horizontal axis 90 of current in amperes (amps). The plot 86 shows a lower incremental inductance for the solenoid 54 compared to the prior art.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the invention may be practiced other than as specifically described.

What is claimed is:

1. A solenoid (54) for a solenoid-actuated valve (30), said solenoid comprising:
    a sintered powder metal one-piece core (64) comprised of at least one soft magnetic material and at least one non-magnetic material integrally connected together; and
    a movable armature (78) disposed in said core (64) and having a tapered tip including an inverse tapered shunt (80) to achieve a required force vs position and current characteristics, wherein a tapered portion of said moveable armature (78) tapers away from an inside diameter of said moveable armature (78) and towards an outside diameter of said moveable armature (78), wherein a force shaping taper on said movable armature (78) allows for a perpendicular material interface of said sintered powder metal one-piece core (64).

2. The solenoid (54) as set forth in claim 1 wherein said armature (78) is coated with high phosphorus electroless nickel plating to provide a sliding bearing surface and to provide physical separation of magnetic material of said armature (78) from said magnetic material of said core (64).

3. The solenoid (54) as set forth in claim 1 wherein said armature (78) is coated with fluoropolymer coating to provide a sliding bearing surface to provide physical separation of magnetic material of said armature from said magnetic material of said core (64).

4. The solenoid (54) as set forth in claim 1 wherein said sintered powder metal one-piece core (64) includes a flux tube (68), a pole piece (66) spaced axially from said flux tube (68), and a flux choke (70) integrally connecting said flux tube (68) and said pole piece (66) together, wherein said flux choke (70) is comprised of austenitic stainless steel and said pole piece (66) and said flux tube (68) are comprised of phosphorus iron.

5. The solenoid (54) as set forth in claim 1 wherein said sintered powder metal one-piece core (64) includes a flux tube (68), a pole piece (66) spaced axially from said flux tube (68), and a flux choke (70) integrally connecting said flux tube (68) and said pole piece (66) together, wherein said flux choke (70) is comprised of austenitic stainless steel and said flux tube (68) and said pole piece (66) are comprised of cobalt iron.

6. The solenoid (54) as set forth in claim 1 including a coil (60) disposed about said core (64).

7. The solenoid (54) as set forth in claim 6 including at least one terminal (62) connected to said coil (60).

8. The solenoid (54) as set forth in claim 6 wherein said coil (60) is made of copper wire.

9. The solenoid (54) as set forth in claim 6 including a can (56) disposed about said coil (60).

10. A solenoid (54) for a solenoid-actuated valve (30), said solenoid (54) comprising:
    a sintered powder metal one-piece core (64) comprised of at least one soft magnetic material and at least one weakly magnetic material integrally connected together; and
    a movable armature (78) disposed in said core (64) and having a tapered tip including an inverse tapered shunt (80) to achieve a required force vs position and current characteristics, wherein a tapered portion of said moveable armature (78) tapers away from an inside diameter of said moveable armature (78) and towards an outside diameter of said moveable armature (78), wherein a force shaping taper on said movable armature (78) allows for a perpendicular material interface of said sintered powder metal one-piece core (64).

11. The solenoid (54) as set forth in claim 10 wherein said armature (78) is coated with high phosphorus electroless nickel plating to provide a sliding bearing surface and to provide physical separation of magnetic material of said armature (78) from said magnetic material of said core (64).

12. The solenoid (54) as set forth in claim 10 wherein said armature (78) is coated with fluoropolymer coating to provide a sliding bearing surface to provide physical separation of magnetic material of said armature from said magnetic material of said core (64).

13. The solenoid (54) as set forth in claim 10 wherein said sintered powder metal one-piece core (64) includes a flux tube (68), a pole piece (66) spaced axially from said flux tube (68), and a flux choke (70) integrally connecting said flux tube (68) and said pole piece (66) together, wherein said flux choke (70) is comprised of austenitic stainless steel and said pole piece (66) and said flux tube (68) are comprised of phosphorus iron.

14. The solenoid (54) as set forth in claim 10 wherein said sintered powder metal one-piece core (64) includes a flux tube (68), a pole piece (66) spaced axially from said flux tube (68), and a flux choke (70) integrally connecting said flux tube (68) and said pole piece (66) together, wherein said flux choke (70) is comprised of austenitic stainless steel and said flux tube (68) and said pole piece (66) are comprised of cobalt iron.

15. A solenoid-actuated valve (30) comprising:
a solenoid (54);
a valve body (32) connected to and operatively associated with said solenoid (54);
a valve (34) axially and slidingly disposed within said valve body (32);

said solenoid (54) comprising a sintered powder metal one-piece core (64) comprised of at least one soft magnetic material and at least one non-magnetic material integrally connected together and a movable armature (78) disposed in said core (64) and having a tapered tip including an inverse tapered shunt (80) to achieve a required force vs position and current characteristics, wherein a tapered portion of said moveable armature (78) tapers away from an inside diameter of said moveable armature (78) and towards an outside diameter of said moveable armature (78); and wherein said sintered powder metal one-piece core (64) includes a flux tube (68), a pole piece (66) spaced axially from said flux tube (68), and a flux choke (70) integrally connecting said flux tube (68) and said pole piece (66) together, and wherein a force shaping taper on said movable armature (78) allows for a perpendicular material interface of said sintered powder metal one-piece core (64).

16. The solenoid (54) as set forth in claim 4, wherein said flux choke (70) has a rectangular cross-section.

* * * * *